(12) United States Patent
Son

(10) Patent No.: US 6,910,969 B2
(45) Date of Patent: Jun. 28, 2005

(54) POWER TRANSMISSION APPARATUS FOR CLUTCHLESS COMPRESSOR

(75) Inventor: Eun Gi Son, Daejeon (KR)

(73) Assignee: Halla Climate Control Corporation, Daejeon (KR)

( * ) Notice: Subject to any disclaimer, the term of this patent is extended or adjusted under 35 U.S.C. 154(b) by 0 days.

(21) Appl. No.: 10/615,989

(22) Filed: Jul. 10, 2003

(65) Prior Publication Data

US 2004/0009818 A1 Jan. 15, 2004

(30) Foreign Application Priority Data

Jul. 12, 2002 (KR) .................. 10-2002-0040663

(51) Int. Cl.[7] .................................................. F16D 7/02
(52) U.S. Cl. ............................ 464/41; 464/81; 464/30
(58) Field of Search ............................ 464/81, 85, 37, 464/41, 30, 76, 32; 192/56.1

(56) References Cited

U.S. PATENT DOCUMENTS 5,683,299 A * 11/1997 Kishibuchi et al. .......... 464/85
5,697,261 A * 12/1997 Mokdad et al. .............. 464/85

FOREIGN PATENT DOCUMENTS

EP           0861993 A2 *  9/1998
JP           10-299855      11/1998

* cited by examiner

*Primary Examiner*—Aaron Dunwoody
(74) *Attorney, Agent, or Firm*—Lowe Hauptman & Berner, LLP

(57) ABSTRACT

A power transmission apparatus includes a pulley connected to a driving source and receiving a rotational force, at least one damper installed on the pulley, and a cover plate including a hub connecting the pulley and a compressor, a fixed plate coupled to an upper surface of the hub, and a plurality of deformation members independently installed on an outer circumferential surface of the fixed plate, wherein, when an overload is applied to the compressor, the deformation members are deformed and a coupling relationship with the damper is released so that power transmission from the driving source is cut off.

3 Claims, 9 Drawing Sheets

POWER TRANSMISSION APPARATUS FOR CLUTCHLESS COMPRESSOR

BACKGROUND OF THE INVENTION

This application claims the priority of Korean Patent Application No. 2002-40663 filed on 12 Jul. 2002 in the Korean Intellectual Property Office, the disclosure of which is incorporated herein in its entirety by reference.

1. Field of the Invention

The present invention relates to a power transmission apparatus, and more particularly, to a power transmission apparatus for a clutchless compressor which can be used for a compressor for a car, lower a starting torque generated at the initial starting and prevent damage to driven apparatuses such as the compressor when the limit torque is generated.

2. Description of the Related Art

Driven apparatuses receiving a rotational force from a driving source such as an engine or other motors of a car use the driving source and a clutch as a power transmission means to transmit power by the connection/disconnection operation of the clutch. In particular, in a compressor used in an air-conditioning apparatus for a car, the power of the engine is usually transmitted by the above operation of the clutch. However, a method of not using the clutch as a power transmission means has been suggested and the method is gradually adopted in the air-conditioning apparatus for a car.

A clutch compressor used for a car does not have a clutch connected/disconnected to a driving pulley by receiving a driving force of the engine, unlike a conventional clutch compressor, and receives the power of the engine so that a rotational shaft of the compressor is always rotated. The clutch compressor is often used for a variable capacity compressor.

The clutchless compressor always receives power via a belt during the driving of a driving motor or an engine. A pulley is rotatably supported on an outer circumferential surface of a nose portion of the compressor via bearings interposed therebetween. The pulley is connected to a pulley of the driving motor via a motorized belt and receives the driving force of the driving motor or the engine. As a hub connected to a driving shaft of the compressor receives a rotational force of the pulley via a power transmission apparatus, the driving shaft of the compressor can rotate.

Since the clutchless compressor always rotates by receiving the rotational force of the engine, when an abnormal torque is generated from the engine, the abnormal torque is transmitted to the compressor as it is, which may damage the compressor.

Thus, in the clutchless power transmission apparatus, when the driving force of a driving source operates abnormally, the abnormal driving force needs to be transmitted to a driven apparatus. Accordingly, methods of disconnection from a driving source in a power transmission apparatus have been suggested.

FIG. 1 illustrates a power transmission apparatus which is disclosed in Japanese Patent Publication No. hei 10-299855. Referring to FIG. 1, a power transmission apparatus 10 includes a connection mechanism consisting of a pulley 11 rotating by receiving a rotational force from an engine, first and second hubs 12 and 13 connected to a rotational shaft of a compressor, an elastic member 14 coupled to connect the pulley 11 and the first and second hubs 12 and 13 and elastically deformable, and first and second support members 15 and 16 supporting the elastic member 14.

In the power transmission apparatus having the above structure, when an over load such as an abnormal torque is applied, the outer circumferential surface of the elastic member 14 slides over the first support member 15 so that the transmission of power is prevented.

In addition to the above invention, many inventions capable of disconnection from a driving source have been developed. However, in the conventional power transmission apparatuses, the structure is complicated and thus manufacturing cost increases. Furthermore, in the power transmission apparatuses, since a mechanism to reduce a starting torque generated at the initial starting is not adopted, fatigue increases so that, after a long-term use thereof, a value of torque at which the transmission of power is disconnected is gradually decreased. As a result, life span of the driven apparatus, in particular, the compressor of an air-conditioning apparatus for a car, is reduced.

SUMMARY OF THE INVENTION

To solve the above and/or other problems, the present invention provides a power transmission apparatus which can improve life span thereof by reducing a starting torque generated at the initial staring.

Also, the present invention provides a power transmission apparatus having a simple structure which can be easily disconnected from a driving source when an abnormal torque is generated.

According to an aspect of the present invention, a power transmission apparatus includes a pulley connected to a driving source and receiving a rotational force, at least one damper installed on the pulley, and a cover plate including a hub connecting the pulley and a compressor, a fixed plate coupled to an upper surface of the hub, and a plurality of deformation members independently installed on an outer circumferential surface of the fixed plate, wherein, when an overload is applied to the compressor, the deformation members are deformed and a coupling relationship with the damper is released so that power transmission from the driving source is cut off.

The deformation member of the cover plate includes at least one main slit to deform an front end of the deformation member and at least one auxiliary slit to deform a side surface of the deformation member.

The deformation member of the cover plate has a front surface and both side surfaces in a direction in which the pulley rotates which are closed and a rear surface and a lower surface which are open, so that the deformation member is coupled to the damper to enclose the damper.

The damper has first and second protrusions protruding in a direction in which the pulley rotates from both side edges of the damper and at least one auxiliary protrusion protruding in a direction perpendicular to the direction in which the pulley rotates.

The damper comprises a support portion coupled to the pulley and an elastic portion enclosing an outer surface of the support portion.

The damper comprises at least one protrusion formed of an elastic resin member and a fixed portion integrally formed with the pulley and having at least one coupling groove in which the protrusion is inserted and fixed.

The damper comprises a fixed portion integrally formed with the pulley and at least one protrusion is formed of an elastic resin material and molded integrally with the fixed portion.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

A power transmission apparatus according to a preferred embodiment of the present invention will now be described in detail with reference to the accompanying drawings. The power transmission apparatus according to the present invention is preferably used for a clutchless compressor of an air-conditioning apparatus for a car. In a preferred embodiment of the present invention, a power transmission apparatus for a clutchless compressor for a car a will be described.

Figure 1:
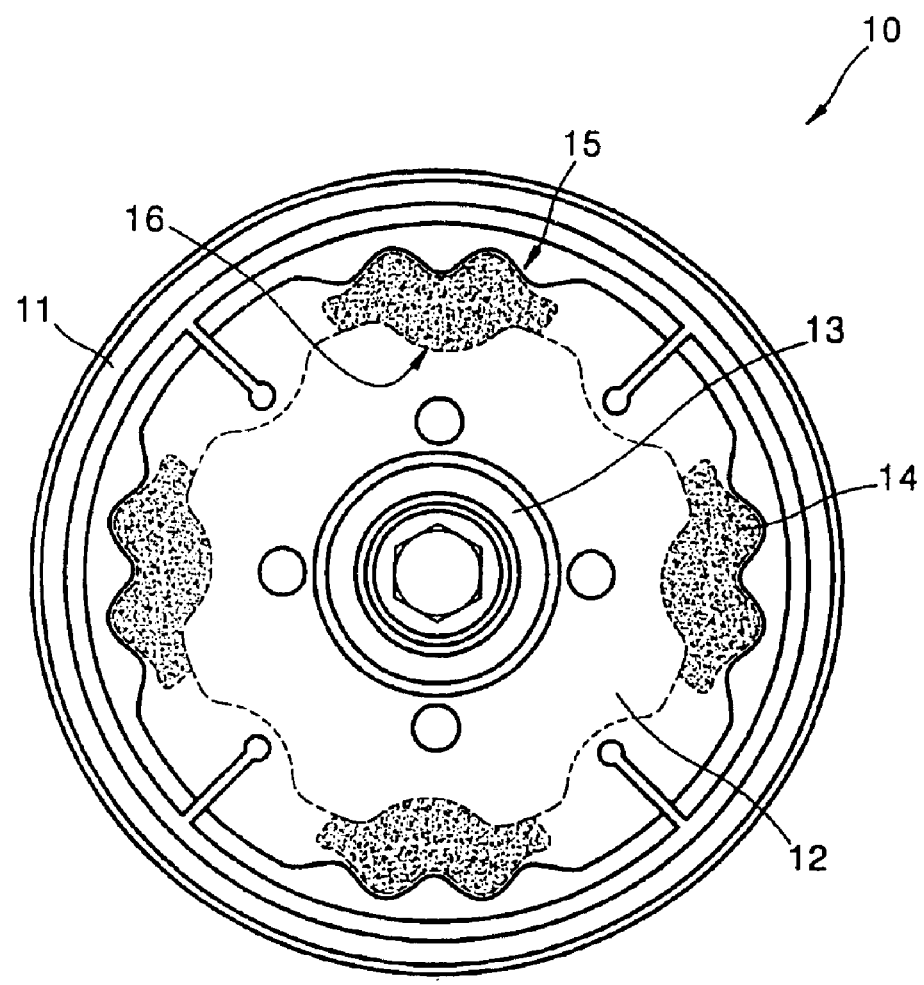
FIG. 1 is a front view illustrating a conventional power transmission apparatus.
Figure 2:
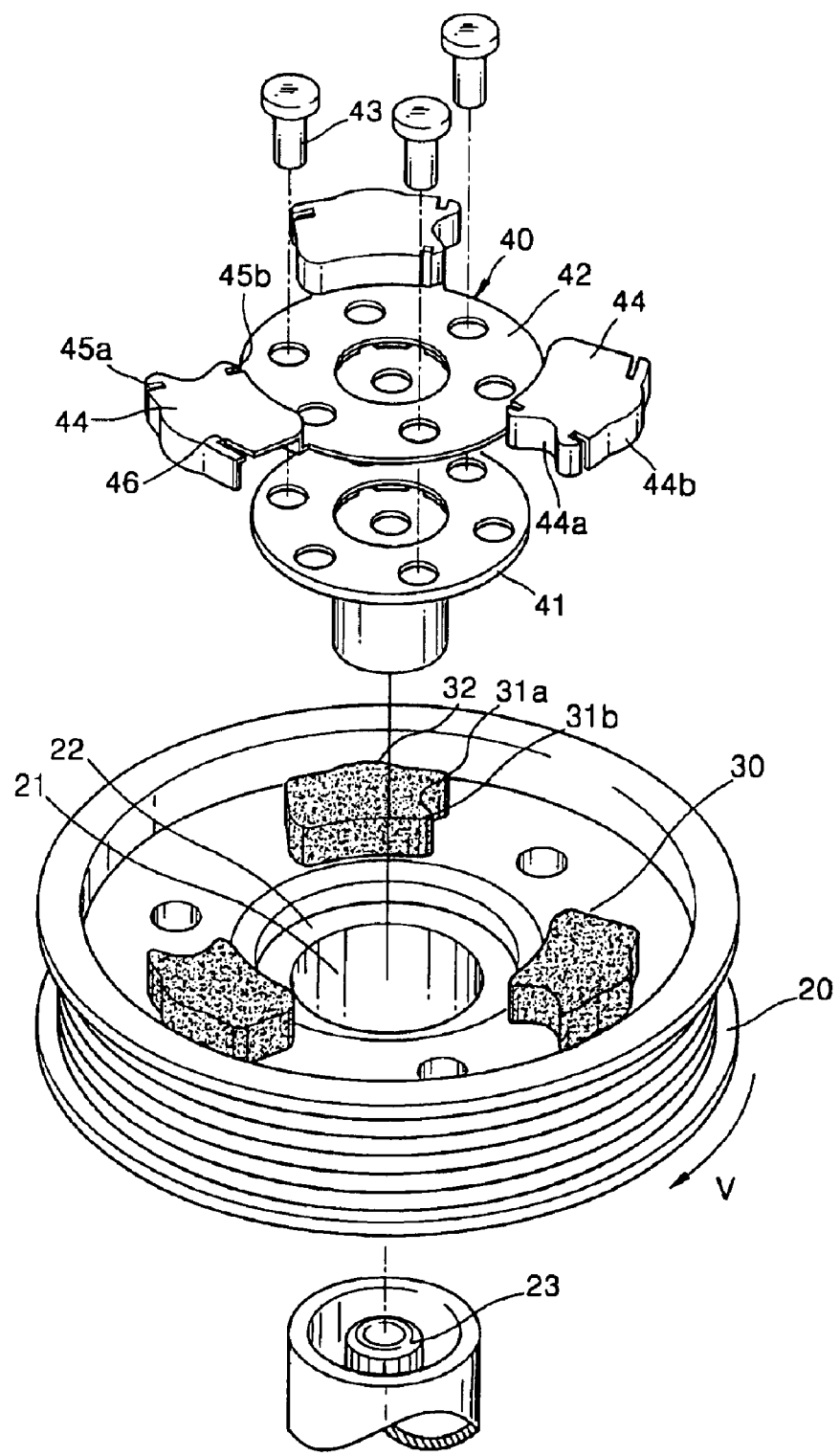
FIG. 2 is an exploded perspective view illustrating a power transmission apparatus according to a preferred embodiment of the present invention.
Figure 10:
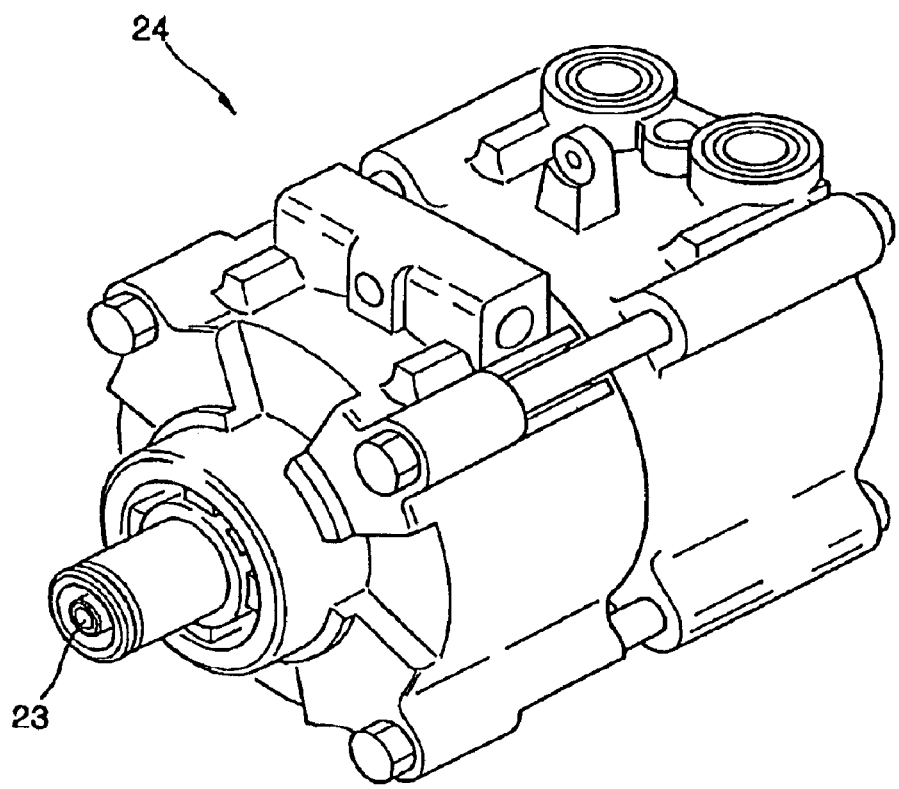
FIG. 10 is a perspective view showing a compressor connectable to the power transmission apparatus of the present invention.

FIG. 2 shows a power transmission apparatus for a clutchless compressor for a car according to a preferred embodiment of the present invention. Referring to FIG. 2, a power transmission apparatus for a clutchless compressor for a car according to a preferred embodiment of the present invention includes a pulley 20 receiving a rotational force from an engine of a car, a damper 30 installed on an upper surface of the pulley 20 and having at least one protrusion 31a (31b) protruding in a direction V in which the pulley 20 rotates, and a cover plate 40 coupled to the damper 30 and receiving the rotational force from the pulley 20 and transmitting the received rotational force to a rotational shaft 23 of the compressor (24, FIG. 10).

The pulley 20 has a coupling hole 21 at the center thereof and the rotational shaft 23 of the compressor is inserted in the coupling hole 21. A bearing 22 is provided between the rotational shaft 23 and the coupling hole 21 so that the rotational shaft 23 is freely rotated with respect to the pulley 20.

At least one damper 30 is installed on an upper surface of the pulley 20 to transmit the rotational force of the pulley 20 to the cover plate 40. At least an outer surface of the damper 30 is formed of an elastic material. According to the present preferred embodiment of the present invention, three dampers are installed around the coupling hole 21 of the pulley 20. The number of the damper 30 is not limited thereto and can be changed.

The damper 30 is installed along the pulley rotation direction V around the coupling hole 21. At least one protrusions 31a (31b) can be formed on the damper 30 along the pulley rotation direction V. At least one auxiliary protrusion 32 protruding in a direction perpendicular to the pulley rotation direction V can be formed.

Figure 3A:
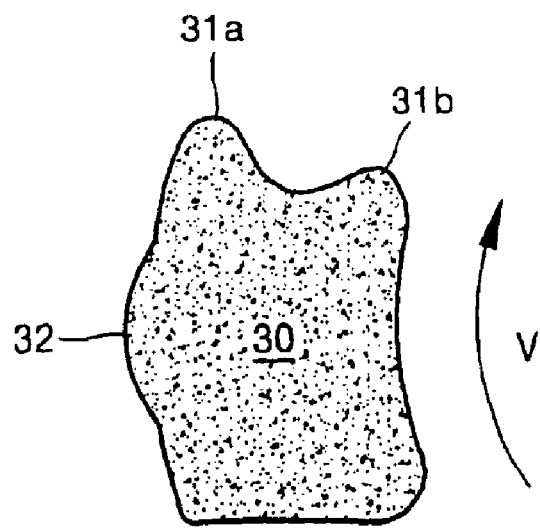
FIGS. 3A through 3C are views illustrating dampers according to different preferred embodiments of the present invention.
Figure 3B:
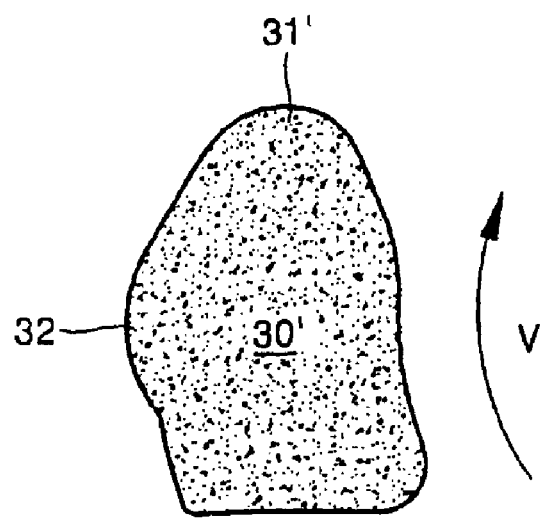
Figure 3C:
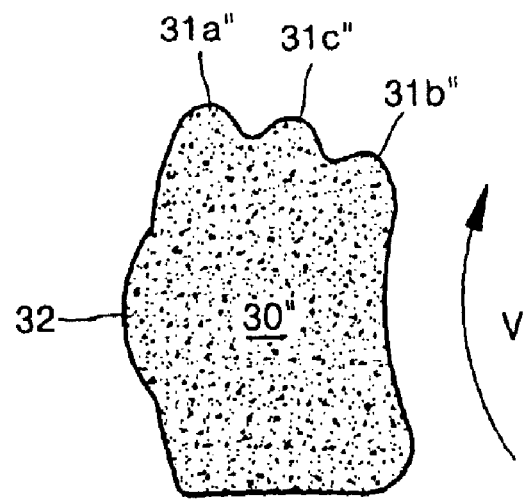

The shape of the protrusions formed on the damper 30 is shown in detail in FIGS. 3A through 3C.

As shown in FIG. 3A, the protrusion formed on the damper 30 may include the first and second protrusions 31a and 31b protruding in the pulley rotation direction V and the auxiliary protrusion 32 protruding in a direction perpendicular to the pulley rotation direction V. The first and second protrusions 31a and 32b protrude from the edges of both side surfaces of the damper 30. The first and second protrusions 31a and 31b have functions of reducing a starting torque generated at the initial starting of an engine and disconnecting the pulley 20 from the cover plate 40 connected to the compressor when an excessive torque is generated, by deforming a deformation member of the cover plate 40. The protrusion may be a single protrusion 31' protruding in the pulley rotation direction V, as shown in FIG. 3B, or first and second protrusions 31a" and 31b" protruding from the edges of the both side surfaces and a third protrusion 31c" protruding between the first and second protrusions 31a" and 31b", as shown in FIG. 3C. In the dampers 30' and 30", the auxiliary protrusion 32 can protrude in a direction perpendicular to the pulley rotation direction V.

The auxiliary protrusion 32 protruding in a direction perpendicular to the pulley rotation direction V has a function of auxiliary guiding deformation of the deformation member of the cover plate when an excessive torque is generated. As shown in FIGS. 3A and 3B, in the preferred embodiments of the present invention, an auxiliary protrusion can be installed outwardly with respect to the pulley rotation direction V. However, the auxiliary protrusion is not limited to the above preferred embodiments and can be formed inwardly, that is, toward the center of rotation, or more than one auxiliary protrusion can be installed at each side surface.

As described above, the damper 30 where protrusions are formed may include a support portion 33 coupled to the upper surface of the pulley 20 and an elastic portion 34 formed to enclose the outer surface of the support portion 33. Here, at least one rivet member 33a can be formed on the lower surface of the support portion 33 to be rivet-coupled to the pulley 20. Since the elastic portion 34 is formed of an elastic resin material, the elastic portion 34 can be molded on the outer surface of the support portion 33. Thus, the support portion 33 corresponds to a frame of the damper 30 and the elastic portion 34 corresponds to an outer cover of the damper 30. Accordingly, although not shown in the drawings, the support portion 33 of the damper 30 according to the present preferred embodiment of the present invention may have the same shape as that of the damper 30. That is, the support portion 33 has a structure having protrusions corresponding to the shape of the damper 30. The protrusions are not only formed by the elastic portion 34 but also formed by the support portion 33 so that the strength of the protrusions are further increased. As the support portion 33 is formed to have the same shape of the damper 30, when an abnormal torque is generated, the power can be disconnected more quickly and accurately.

Figure 5:
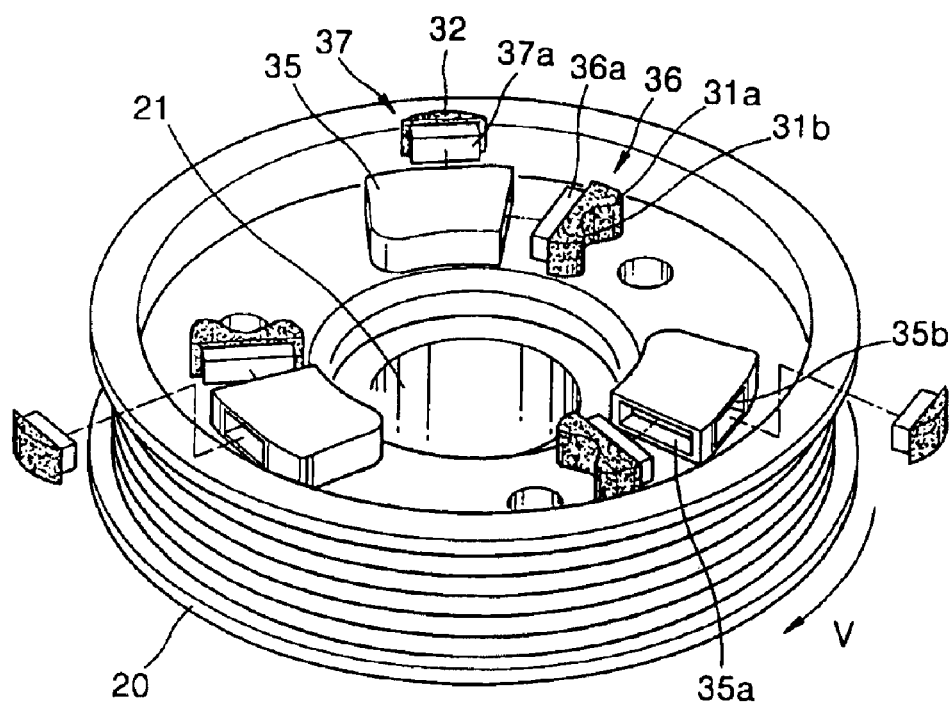
FIG. 5 is a partially-exploded perspective view illustrating a damper according to yet another preferred embodiment of the present invention.

The damper 30, as shown in FIG. 5, may include a fixed portion 35 integrally formed on the upper surface of the pulley 20 with the pulley 20 and protruding pieces 36 and 37 inserted in the fixed portion 35. The protruding pieces may be a first protruding piece 36 including a first protrusion 31a and a second protrusion 31b protruding in the pulley rotation direction V and a second protruding piece 37 including an auxiliary protrusion 32. Coupling protrusions 36a and 37a which can be inserted in the fixed portion 35 are formed at the rear end of each of the first and second protruding pieces 36 and 37. The fixed portion 35 may include at least one coupling groove so that the protrusion pieces 36 and 37 can be inserted therein. A first coupling groove 35a for insertion of the first protruding piece 36 is formed in the pulley rotation direction V while a second coupling groove 35b for insertion of the second protruding piece 37 is formed in a direction perpendicular to the pulley rotation direction V. In FIG. 5, a case of a damper having two protrusions in the pulley rotation direction V as shown in FIG. 3A is illustrated. However, the protruding pieces can be adopted in a damper having one or three protrusions formed in the pulley rotation direction V as shown in FIGS. 3B and 3C. Also, although not shown in the drawings, each of the first and second protrusions 31a and 31b has a separate coupling protrusion so as to be independently coupled to the coupling groove which is individually formed in the fixed portion 35.

The structure of the damper shown in FIG. 5 can be formed by synthetic resin injection. That is, the pulley 20 and the fixed portion 35 are integrally formed of synthetic resin such as plastic by injection and the protrusion pieces 36 and 37 are formed of an elastic resin material so as to be coupled to the coupling grooves 35a and 35b formed in the fixed portion 35. Thus, by coupling the pulley 20 and the fixed portion 35 formed of synthetic resin in injection and the protrusion pieces 36 and 37 formed of an elastic resin material, coupling therebetween can be maintained more firmly.

In the meantime, the above structure can be manufactured in a different method although it is not shown in the drawings. That is, the pulley 20 and the fixed portion 35 are integrally injection molded using a synthetic resin material and the protrusions are molded with an elastic resin material, that is, a secondary injection is performed. At this time, the coupling grooves 35a and 35b shown in FIG. 5 are not necessary. When the protrusions are integrally formed by injection, a coupling strength is further increased.

Figure 4:
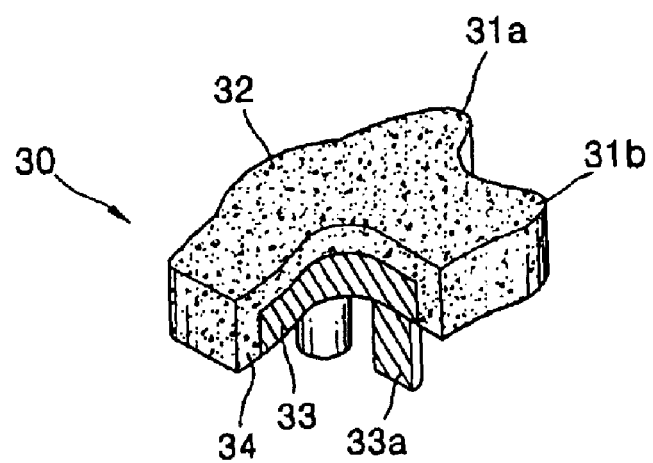
FIG. 4 is a partially cut-away perspective view illustrating a damper according to another preferred embodiment of the present invention.

The manufacturing of a damper by double injection can be applied to the structure shown in FIG. 4. That is, the support portion 33 and the pulley 20 as shown in FIG. 4 are integrally injection molded by synthetic resin and then the elastic portion 34 is molded thereon with elastic resin, that is, a secondary injection is performed, so that a more firm coupling force can be maintained.

In the meantime, as can be seen from FIG. 2, the cover plate 40 is fixedly coupled to an end portion of the rotational shaft 23 installed by penetrating the pulley 20 and may include a hub 41 coaxially connected to the rotational shaft 23 and a fixed plate 42 coupled to the upper surface of the hub 41. The hub 41 and the fixed plate 42 are coupled by a plurality of rivets 43.

Figure 6:
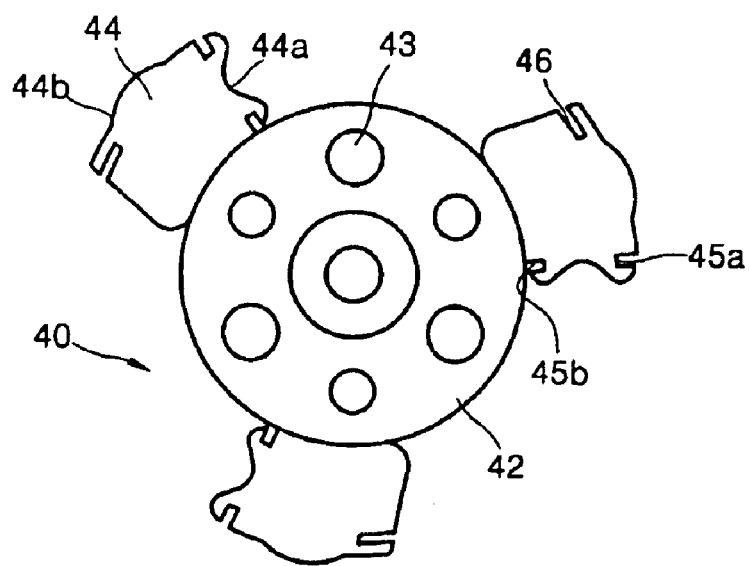
FIG. 6 is a front view illustrating the cover plate of FIG. 2.

The fixed plate 42 coupled to the upper surface of the hub 41 has a shape corresponding to the hub 41, as shown in FIG. 6, and at least one deformation member 44 is formed along the outer circumferential surface thereof. That is, a plurality of deformation members 44 are independently installed on the outer circumferential surface of the fixed plate 42. The deformation members 44 are integrally formed with the fixed plate 42.

Figure 7:
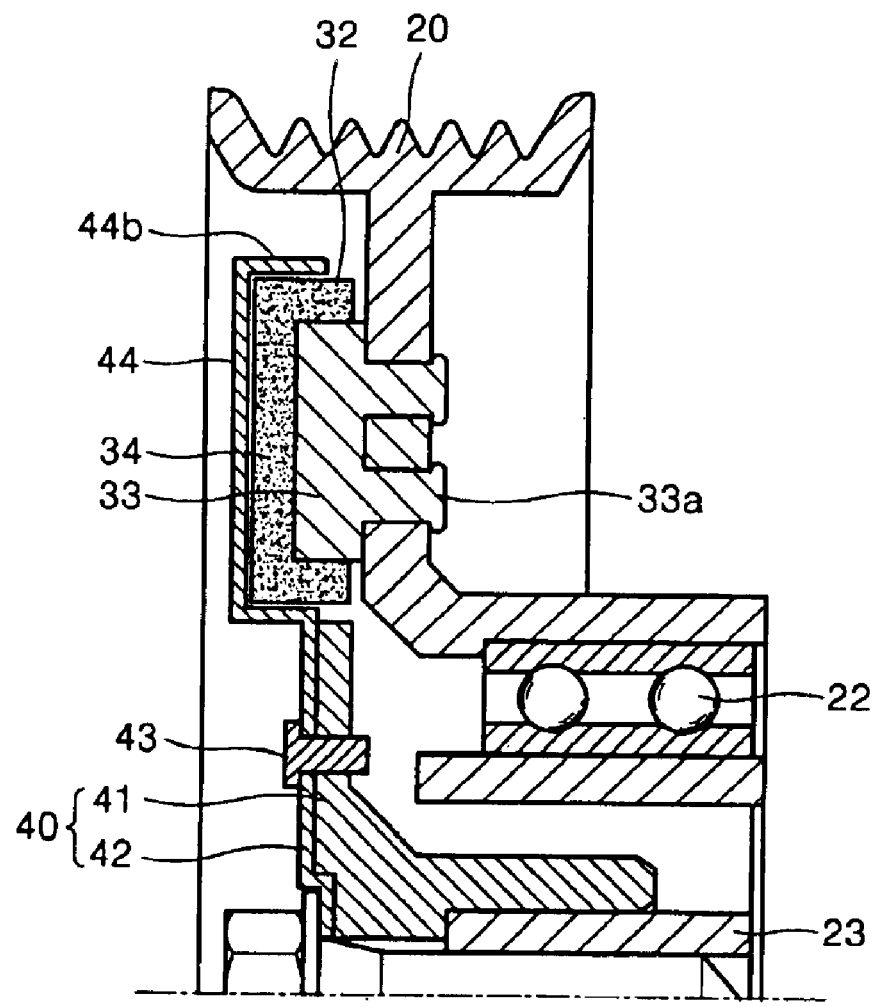
FIG. 7 is a sectional view illustrating the power transmission apparatus of FIG. 2.

The deformation member 44 protrude upward from the fixed plate 42 and are formed capable of enclosing the damper 30 installed on the pulley 20, as can be seen from FIG. 7. That is, the deformation member 44, as can be seen from FIGS. 2 and 7, is formed to enclose at least three side surfaces of the damper 30 in the pulley rotation direction V and the lower end portion thereof is connected to the fixed plate 42.

The deformation member 44 supports the damper 30 installed on the pulley 20 to transfer a rotational force of the pulley 20 to the cover plate 40. The deformation member 44 includes a main deformation portion 44a capable of supporting the first and second protrusions 31a and 31b of the damper 30 protruding in the pulley rotation direction V. The main deformation portion 44a is formed at the front portion of the damper 30 and has a shape corresponding to the shape of the protrusions. Also, at least one main slit which can guide deformation of the front end of the deformation member 44, in particular, the main deformation portion 44a, when the rotational force of the pulley 20 increases over a predetermined value, that is, an abnormal torque is generated, is formed in the deformation member 44. According to the preferred embodiment of the present invention, the main slit is formed of a first slit 45a and a second slit 45b disposed at both sides of the main deformation portion 44a so that, when an abnormal torque is generated, the deformation portion 44a can be deformed by being lifted upward. An auxiliary slit 46 guiding deformation of the side surface of the deformation member 44 according to the auxiliary protrusion 32 of the damper 30 is formed at the rear end of the deformation member 44. The auxiliary slit 46, as shown in FIGS. 2 and 6, can be formed in the circumferential direction of the pulley 20 and the outer side surface of the deformation member 44, that is, the auxiliary deformation portion 44b, can be deformed by the auxiliary slit 46. These slits extend from the upper portion of the deformation member 44 to the side surface thereof.

The front surface and side surfaces of the deformation member 44 in the pulley rotation direction V are closed while the rear surface and the lower surface thereof are open. Accordingly, the deformation member 44 can be coupled to the damper 30 of the pulley 20 to encompass the damper 30 with respect to the pulley rotation direction V. Thus, the rotation force of the pulley 20 can be transferred to the cover plate 40 as it is.

The deformation member 44 is provided in a number corresponding to the number of the damper 30 formed on the pulley 20. The shapes of the main deformation portion 44a and the auxiliary deformation portion 44b can be changed corresponding to the shape of the damper 30.

Next, the operation of the power transmission apparatus having the above structure will now be described with reference to the accompanying drawings.

When the compressor is normally operated, the rotational force of the pulley 20 is transmitted to the deformation member 44 supporting the damper 30, in particular, the main deformation portion 44a, via the damper 30, to rotate the cover plate 40 and consequently the rotational shaft 23 connected to the cover plate 40. Thus, as the rotational force of the pulley 20 is transmitted to the rotational shaft 23 of the compressor, the compressor is operated.

At the initial starting of an engine, that is, when the pulley 20 begins to rotate, a starting torque is applied to the damper 30 in the pulley rotation direction V. The starting torque is generated when a force is applied to the member not in motion, which can work as an initial impact and is applied as a great force to the deformation member 44 of the cover plate 40, in particular, the main deformation portion 44a, to support the damper 30 and drive the compressor. Thus, such a starting torque add stress to the deformation member 44, in particular, the main deformation portion 44a, so that the main deformation portion 44a is deformed faster. To solve the starting torque problem generated at the initial starting, in the present invention, at least one protrusion 31a (31b) is formed on the damper 30 in the pulley rotation direction V and the main deformation portion 44a of the deformation member 44 supports the protrusions 31a (31b). That is, according to the present preferred embodiment of the present invention, the starting torque generated at the initial starting as the main deformation portion 44a of the deformation member 44 supports the first and second protrusions 31a and 31b of the damper 30 can be reduced by being distributed to the first and second protrusions 31a and 31b. The reduction of the starting torque can also be performed by the auxiliary protrusion 32 protruding to the side surface of the damper 30, that is, in a direction perpendicular to the pulley rotation direction V. Since the starting torque generated at the initial staring is distributed by the protrusions formed in the pulley rotation direction V or the protrusions protruding in a direction perpendicular to the pulley rotation direction V, the life span of the clutchless compressor can be prolonged.

Next, when an abnormal torque is generated, the rotational force of the pulley 20 should not be transmitted to the rotational shaft of the compressor and disconnected. The disconnection is performed by the damper 30 of the pulley 20 and the deformation member 44 of the cover plate 40. That is, when the number of rotation of the pulley 20 is excessively increased or malfunction is found in the compressor so that an overload is applied to the rotational shaft 23, to prevent damage of the compressor, the compressor and the pulley 20 should be separated.

Figure 8:
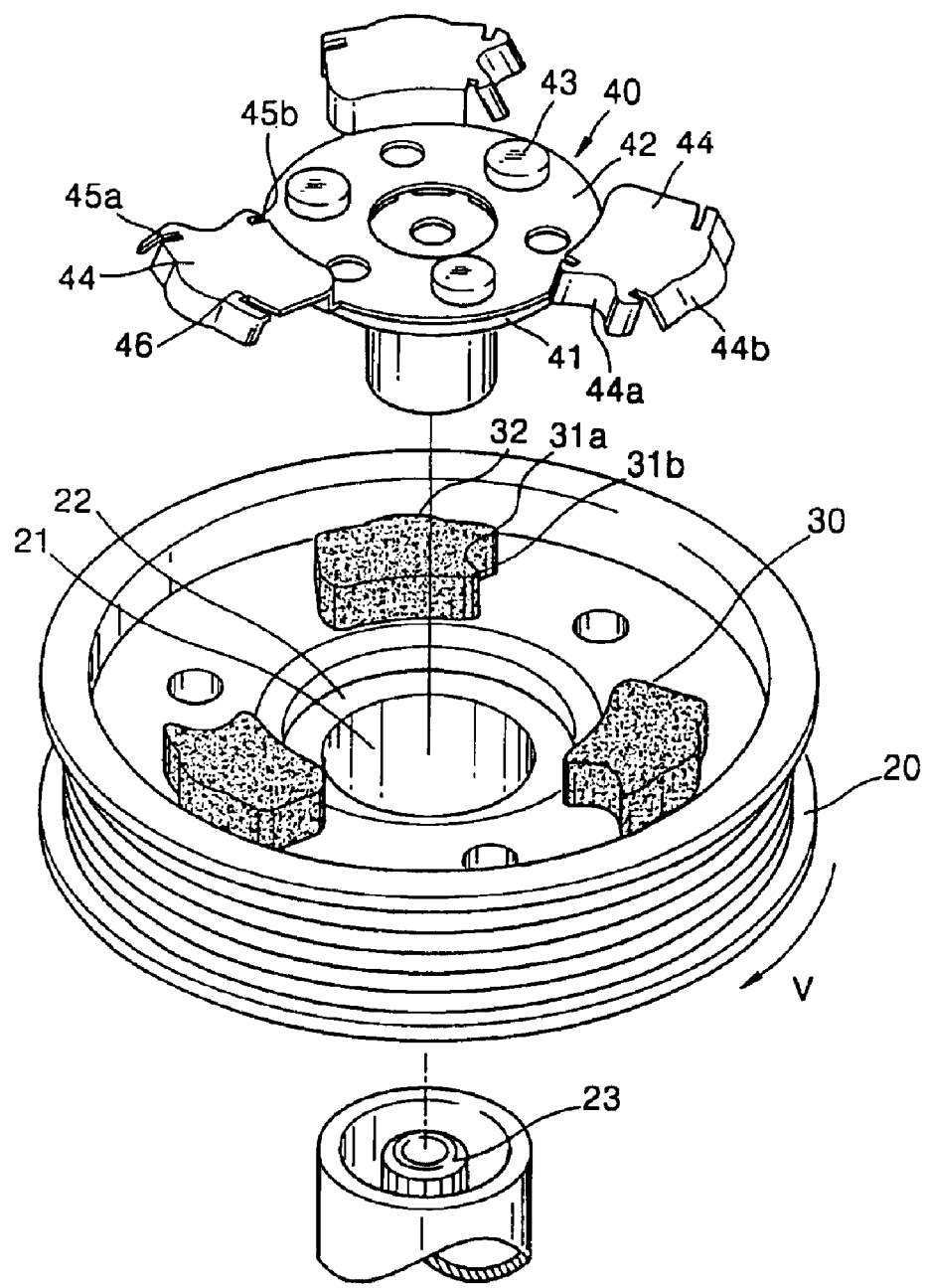
FIG. 8 is an exploded perspective view illustrating a state after the power transmission apparatus of FIG. 2 is deformed.
Figure 9:
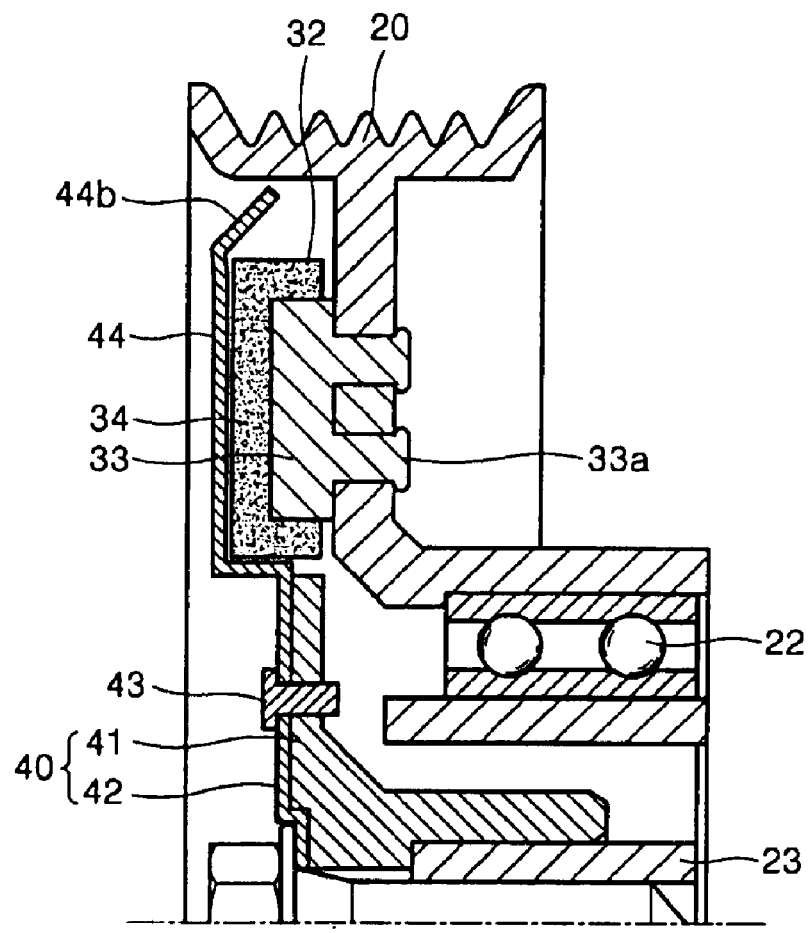
FIG. 9 is a sectional view illustrating a state after the power transmission apparatus of FIG. 8 is deformed.

When an abnormal torque is generated, a difference in the rotational force is generated between the pulley 20 and the rotational shaft 23 of the compressor. The difference in the rotational force works as a deformation force in a circumferential direction of the pulley 20 between the damper 30 of the pulley 20 and the deformation member 44 of the cover plate 40 coupled above the damper 30. Accordingly, the slits 45a, 45b, and 46 formed in the deformation member 44 are widened so that the main deformation portion 44a is lifted above, as shown in FIG. 8, and the auxiliary deformation portion 44b of the deformation member 44 is lifted outward, as shown in FIG. 9.

Thus, the deformation member 44 enclosing the outer circumferential surface of the damper 30 is separated from the damper 30. Consequently, the cover plate 40 is free from the damper 30 and the cover plate 40 is disconnected from the damper 30.

As a result, the rotational force transmitted from the pulley 20 is transmitted only to the damper 30 disposed on the pulley 20 and not transmitted to the deformation member 44 which is in contact with the damper 30. Thus, the power transmission to the cover plate 40 where the deformation member 44 is formed and the rotational shaft 23 of the compressor connected thereto is completely cut off so that the compressor is not operated any longer.

As described above, the power transmission apparatus according to the present invention provides the following effects.

First, since the starting torque generated at the initial starting is reduced by the protrusions formed on the damper, the life span of the driven apparatus such as a clutchless compressor can be prolonged.

Second, when an abnormal torque is generated, due to a simple structure, the power transmission from the driving source can be cut off.

Third, since the number of parts is reduced and the power transmission apparatus is made simply, productivity can be improved.

Fourth, the coupling between the pulley and the damper can be firmly maintained.

Fifth and the last, since the power transmission of the pulley to the rotational shaft of the compressor is cut off at a preset value, malfunction of the compressor due to an overload can be prevented in advance.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A power transmission apparatus, comprising:

a pulley connected to a driving source for receiving a rotational force;

at least one damper installed on the pulley, said damper, as seen in a direction in which the pulley rotates, having a front surface and side surfaces; and a cover plate including a hub connecting the pulley and a compressor, a fixed plate coupled to an upper surface of the hub, and at least one deformation member positioned on an outer circumferential surface of the fixed plate;

wherein the deformation member comprises a main deformation portion supporting the front surface of the damper and an auxiliary deformation portion supporting at least one of the side surfaces of the damper, and when an overload is applied to the compressor, the deformation member is deformed and a coupling relationship with the damper is released so that power transmission from the driving source is cut off; and wherein the deformation member of the cover plate includes at least one main slit to define said main deformation portion in a front end of the deformation member and at least one auxiliary slit to define said auxiliary deformation portion in a side surface of the deformation member.

2. The power transmission apparatus as claimed in claim 1, wherein the damper has first and second protrusions protruding, in the direction in which the pulley rotates, from both side edges of the damper and at least one auxiliary protrusion protruding in a direction perpendicular to the direction in which the pulley rotates.

3. The power transmission apparatus as claimed in claim 1, wherein the damper comprises a support portion coupled to the pulley and an elastic portion enclosing an outer surface of the support portion.

* * * * *